US007403745B2

(12) United States Patent
Dominique et al.

(10) Patent No.: US 7,403,745 B2
(45) Date of Patent: Jul. 22, 2008

(54) CHANNEL QUALITY PREDICTOR AND METHOD OF ESTIMATING A CHANNEL CONDITION IN A WIRELESS COMMUNICATIONS NETWORK (75) Inventors: Francis Dominique, Rockaway, NJ (US); Hongwel Kong, Denville, NJ (US); Walid E. Nabhane, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 336 days.

(21) Appl. No.: 11/194,629

(22) Filed: Aug. 2, 2005

(65) Prior Publication Data
US 2007/0032196 A1 Feb. 8, 2007

(51) Int. Cl.
*H04B 17/00* (2006.01)
(52) U.S. Cl. ................ 455/67.11; 455/67.13; 455/63.1; 455/450; 455/452.1; 455/452.2; 370/329; 370/332; 370/342; 370/335
(58) Field of Classification Search .............. 455/67.11, 455/67.13, 63.1, 450, 452.1, 452.2, 453, 455/436, 442, 437; 370/331
See application file for complete search history.

(56) References Cited

U.S. PATENT DOCUMENTS

| 5,682,407 A * | 10/1997 | Funaki ..................... 375/240 |
| 5,835,508 A * | 11/1998 | Kushita .................... 714/748 |
| 6,269,331 B1 * | 7/2001 | Alanara et al. ............. 704/205 |
| 6,480,522 B1 * | 11/2002 | Hoole et al. ............... 375/130 |
| 6,603,832 B2 * | 8/2003 | Wuppermann et al. ...... 375/377 |
| 6,816,832 B2 * | 11/2004 | Alanara et al. ............. 704/205 |
| 7,035,285 B2 * | 4/2006 | Holloway et al. .......... 370/474 |
| 7,133,441 B1 * | 11/2006 | Barlev et al. .............. 375/222 |
| 7,197,281 B2 * | 3/2007 | Pietraski et al. .......... 455/67.11 |
| 7,209,456 B2 * | 4/2007 | Kwak et al. ................ 370/318 |
| 7,227,854 B2 * | 6/2007 | Kim et al. .................. 370/342 |
| 7,257,423 B2 * | 8/2007 | Iochi ......................... 455/561 |
| 7,272,396 B2 * | 9/2007 | Obuchi et al. .............. 455/436 |
| 2003/0095532 A1 * | 5/2003 | Kim et al. .................. 370/342 |

* cited by examiner

*Primary Examiner*—Marceau Milord (57) ABSTRACT

In one embodiment of the method, a channel quality metric for a first subframe is estimated based at least in part on a channel quality metric for a previous subframe, and a channel quality metric for a second subframe is estimated based at least in part on the channel quality metric for the previous subframe. Here, the second subframe is later in time than the first subframe. Then, a channel quality metric for a time slot located between the first and second subframes is estimated based on the channel quality metrics for the first and second subframes.

18 Claims, 5 Drawing Sheets

CHANNEL QUALITY PREDICTOR AND METHOD OF ESTIMATING A CHANNEL CONDITION IN A WIRELESS COMMUNICATIONS NETWORK

BACKGROUND OF THE INVENTION

1. Field of the Invention

The present invention relates generally to a wireless communications network, and more particularly, to a channel quality predictor and method of estimating a channel condition in a wireless communications network.

2. Description of the Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B and a mobile or User Equipment (UE). UMTS systems typically include multiple radio network controllers (RNCs). The RNC in UMTS networks provides functions equivalent to the Base Station Controller (BSC) functions in GSM/GPRS networks. However, RNCs may have further capabilities including, for example, autonomously managing handovers without involving mobile switching centers (MSCs) and Serving General Packet Radio Service (GPRS) Support Nodes (SGSNs). The Node B is responsible for air interface processing and some Radio Resource Management functions. The Node B in UMTS networks provides functions equivalent to the Base Transceiver Station (BTS) in GSM/GPRS networks. Node Bs are typically physically co-located with an existing GSM base transceiver station (BTS) to reduce the cost of UMTS implementation and minimize planning consent restrictions.

Figure 1:
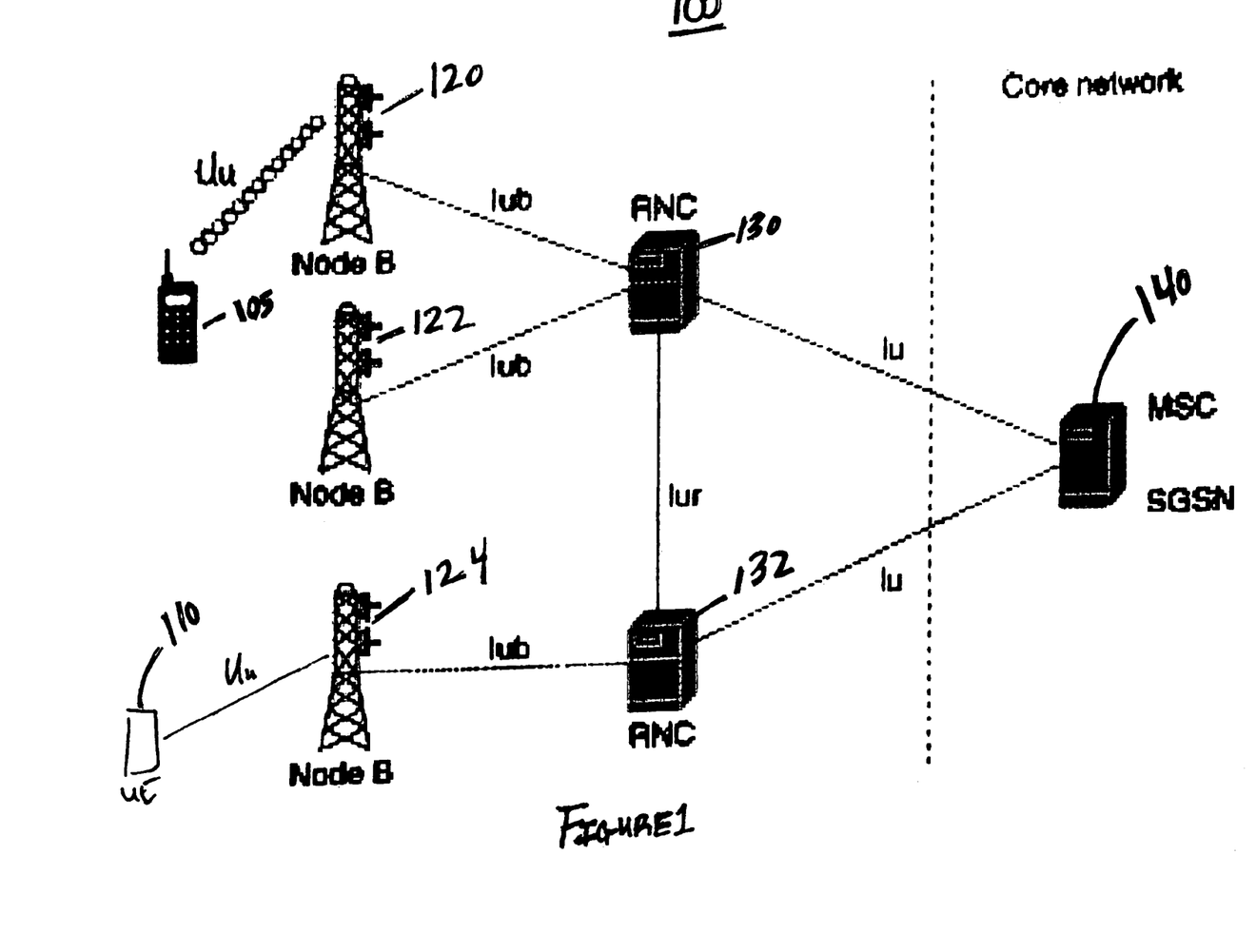
FIG. 1 illustrates a conventional communication system operating in accordance with Universal Mobile Telecommunications System (UMTS) protocols.

FIG. 1 illustrates a conventional communication system 100 operating in accordance with UMTS protocols. Referring to FIG. 1, the communication system 100 may include a number of Node Bs such as Node Bs 120, 122 and 124, each serving the communication needs of UEs such as UEs 105 and 110 in their respective coverage area. The Node Bs are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are conventional interfaces Uu, Iub, Iur and Iu between these elements.

Third generation wireless communication protocol standards (e.g., 3GPP-UMTS, 3GPP2-CDMA, etc.) may employ a dedicated traffic channel in the uplink (e.g., a communication flow between a mobile station (MS) or UE and a base station (BS) or Node B). The dedicated traffic channel may include a data part (e.g., a dedicated physical data channel (DPDCH) in accordance with UMTS protocols, a fundamental channel or supplemental channel in accordance with CDMA2000 protocols, etc.) and a control part (e.g., a dedicated physical control channel (DPCCH) in accordance with UMTS protocols, a pilot/power control sub-channel in accordance with CDMA2000 protocols, etc.).

High Speed Downlink Packet Access (HSDPA) is introduced in Release 5 of the third generation wireless standards for 3GPP-UMTS. To achieve high-speed data transmissions, two new channels in the downlink are introduced; namely, a high speed shared control channel (HS-SCCH) and a high speed downlink shared channel (HS-DSCH). The HS-SCCH carries the control information for the HS-DSCH (the actual packet data). The HS-DSCH is transmitted using a high speed physical downlink shared channel (HS-PDSCH). The HS-SCCH and HS-PDSCH for one cell (e.g., one of Node Bs 120, 122, 124, etc.) are shared by all HSDPA users (e.g., UE 105, UE 110, etc.) in that cell. A Node B scheduler (e.g., for one of Node B 120, Node B 122, Node B 124, etc.) decides which UE (e.g., UE 105/110) to transmit to, a given amount of data to transmit, a given power level for the transmission and a given modulation/coding format for the transmission based on a number of factors, such as an instantaneous downlink quality, quality of services (QoS) requirements, etc. After the Node B scheduler determines the parameters for the transmission, the transmission is scheduled. The data format as well as user identification information is carried in the HS-SCCH that accompanies the HS-PDSCH.

Knowledge of real-time downlink channel quality at the Node B scheduler may affect the efficiency of a HSDPA system. In the current UMTS-HSDPA standards, the downlink channel quality is determined by measuring the channel quality at the UE (e.g., UE 105, UE 110, etc.) and having the UE report the measured channel quality to the Node B (e.g., Node B 120, Node B 122, Node B 124, etc.) through a code channel in the uplink. The uplink control channel is a newly introduced high speed dedicated physical control channel (HS-DPCCH). The HS-DPCCH is introduced in Release 5 of the third generation wireless standards for 3GPP-UMTS to support HSDPA operations and may carry acknowledgment (ACK) and negative ACK (NACK) signals as well as a channel quality indicator (CQI) signal. The measured channel quality may be quantized (e.g., to a 5 bit binary number) at the UE to generate the CQI signal. At the Node B, the CQI signal may be converted into a channel quality metric, for example a common pilot channel (CPICH) carrier-to-noise ratio (Ec/Nt).

For stationary or very low mobility (e.g., slow moving) UEs, the Node B scheduler may use the CPICH Ec/Nt as a measure of the UE's current channel quality because the UE is moving slowly and the CPICH Ec/Nt may approximate the UE's current channel quality. However, as mobility or speed of the UE increases, the CPICH Ec/Nt may be less likely to function as an accurate indicator of the UE's current channel quality. For example, some wireless communication systems have a latency of 9 milliseconds (ms), which means the Node B scheduler is using a value for the CPICH Ec/Nt that is approximately 9 ms older than a current CPICH Ec/Nt. In this example, the conventional measure of the CPICH Ec/Nt may work well for UEs at a velocity less than 10 kilometers per hour (Kmph), but not necessarily for higher velocity UEs.

SUMMARY OF THE INVENTION

The present invention relates to a method and apparatus for estimating a channel condition.

In one embodiment of the method, a channel quality metric for a first subframe is estimated based at least in part on a channel quality metric for a previous subframe, and a channel quality metric for a second subframe is estimated based at least in part on the channel quality metric for the previous subframe. Here, the second subframe is later in time than the first subframe. Then, a channel quality metric for a time slot located between the first and second subframes is estimated based on the channel quality metrics for the first and second subframes.

In one embodiment, for example, the channel quality metric for the previous subframe may be filtered to generate the estimated channel quality metric for the first subframe, and may also be filtered to generate the estimated channel quality metric for the second subframe.

According to an embodiment, the channel quality metric for the time slot is estimated by interpolation using the channel quality metrics for the first and second subframes.

According to an embodiment, a downlink transmission parameter on a downlink channel may be adjusted based on the estimated channel quality metric for the time slot.

In an embodiment of the apparatus, a first filter coefficient generating unit generates at least one first filter coefficient, and a second filter coefficient generating unit generates at least one second filter coefficient. A first filter unit filters a channel quality metric for a previous subframe based on the at least one first filter coefficient to generate a channel quality metric estimate for a first subframe, and a second filter unit filters the channel quality metric for the previous subframe based on the at least one second filter coefficient to generate a channel quality metric estimate for a second subframe, later in time than the first subframe. An interpolator unit then estimates a channel quality metric for a time slot located between the first and second subframes based on the channel quality metric estimates for the first and second subframes.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS OF THE PRESENT INVENTION

In order to better understand the present invention, an example of a conventional uplink frame structure for a UMTS wireless communication system and an example communication flow of a conventional downlink channel quality reporting will be described, followed by descriptions of downlink channel quality prediction according to example embodiments of the present invention.

Conventional UMTS Uplink Frame Structure

Figure 2:
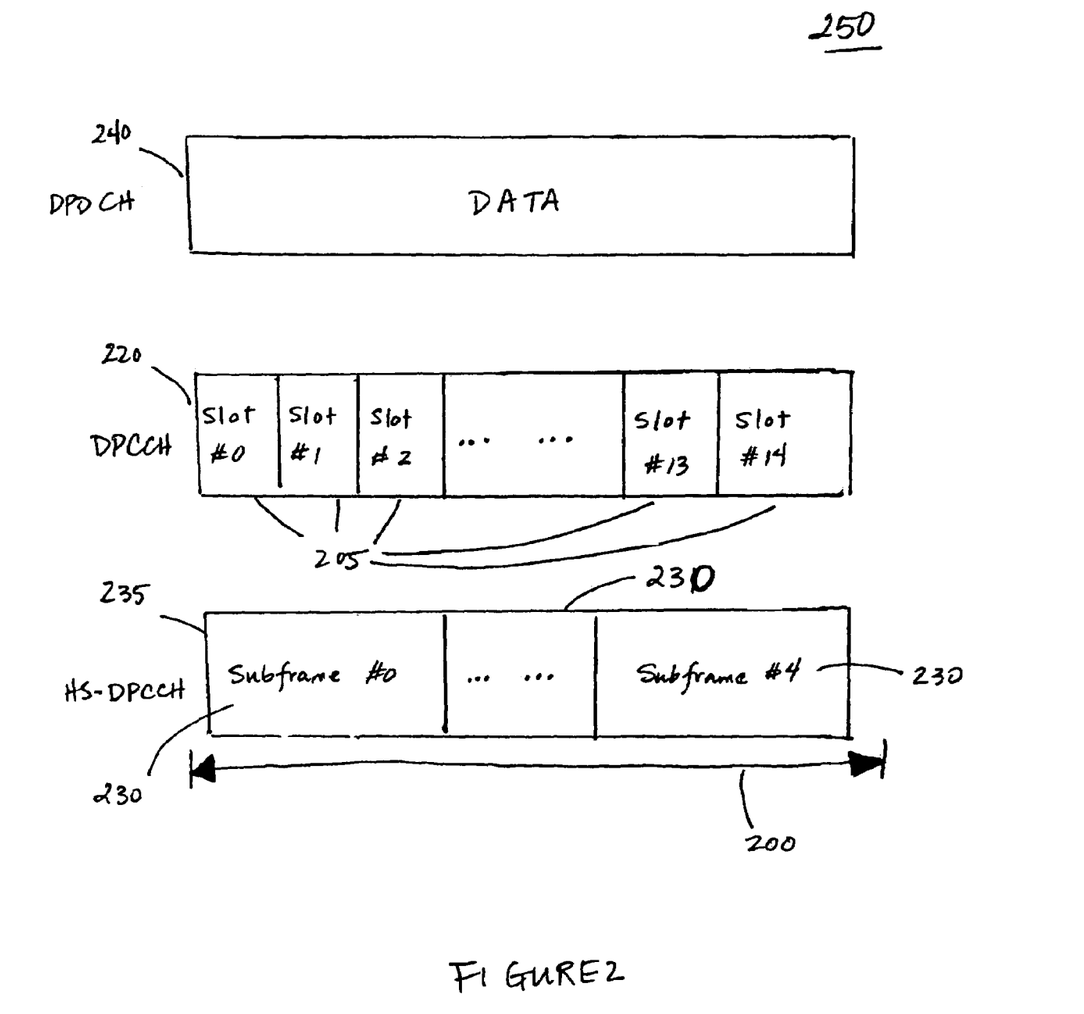
FIG. 2 illustrates an example of a frame of a UMTS uplink dedicated traffic channel including a high speed dedicated physical control channel (HS-DPCCH).

FIG. 2 illustrates an example of a frame 200 of a UMTS uplink dedicated traffic channel 250 including a DPDCH 240, a DPCCH 220 and a high speed dedicated physical control channel (HS-DPCCH) 235. Each frame 200 may have a length of, for example, 10 milliseconds (ms) and, for the DPCCH 220, may be partitioned into a plurality of slots 205 (e.g., 15 slots). Each slot 205 may have a length of, for example, 2560 chips, which may correspond to one power-control period, and may have a duration of, for example ⅔ ms. The DPCCH 220 will be described in further detail below with respect to FIG. 3.

Each of the DPCCH 220 and the DPDCH 240 may be code multiplexed. The DPDCH 240 may include information transmitted from a mobile station or user equipment (UE). The HS-DPCCH 225 may include a plurality of subframes 230 within the frame 200. Each subframe 230 in the HS-DPCCH may correspond to a plurality of slots 205 in the DPCCH.

Figure 3:
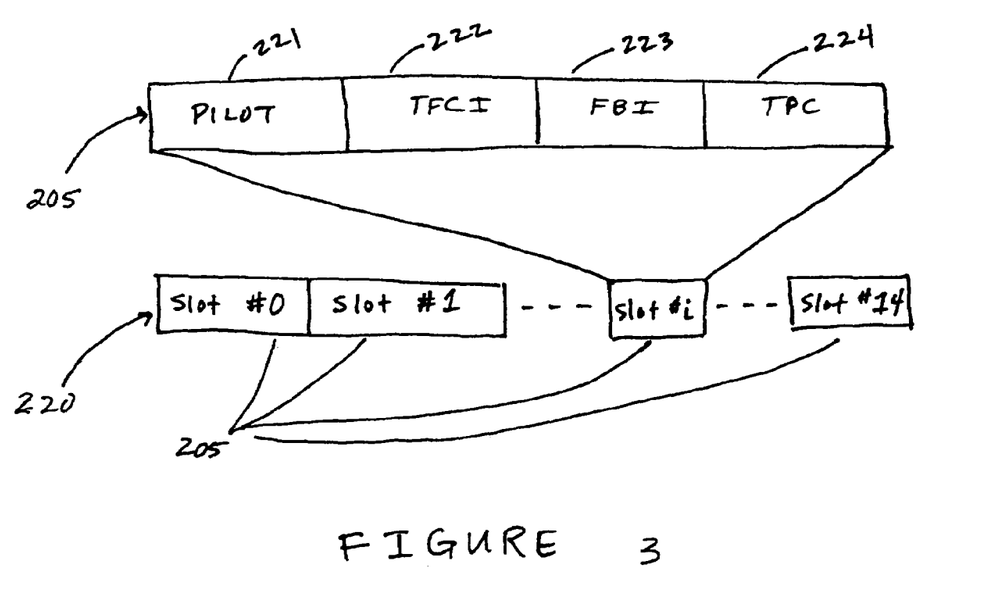
FIG. 3 illustrates an example slot structure for a given slot of a DPCCH.

FIG. 3 illustrates an example slot structure for a given slot 205 of the DPCCH 220. Each slot 205 in the frame 200 of the DPCCH 220 may include control information, for example, a pilot signal 221, a transmit power control (TPC) command 222, transport format combination indicator (TFCI) bits 223 and feedback information (FBI) 224.

In an example, each slot 205 may include a total of 10 bits, with a given number of pilot bits (e.g., pilot signal 221) and control bits (e.g., a combination of TPC bits in the TPC command 222, TFCI bits 223 and FBI bits 224). In a further example, each slot 205 may include 10 bits with 5 pilot bits, 2 TFCI bits, 1 FBI bit and 2 TPC bits. However, the number of total bits for each slot 205 as well as the bit composition of each slot 205 (e.g., other numbers of TFCI bits, FBI bits, pilot bits, TPC bits, etc.) may vary and may be controlled by a RNC (e.g., RNC 130, RNC 132, etc.).

The TFCI 223 may inform a Node B of the transport format of information (e.g., voice and/or data packets, frames, etc.) transmitted from a UE.

Each of the UE and the Node B may generate and transmit TPC bits in the TPC command 222 of the uplink DPCCH 220 and the downlink DPCCH (not shown), respectively, to control each others transmit power. When the UE communicates with, for example, a single Node B (e.g., when the UE is not in soft handoff), a single TPC command 222 may be received in each timeslot.

In an example, each slot 205 in the frame 200 may include a TPC command 222 with either 1 or 2 TPC bits. If a given slot 205 includes 2 TPC bits, the values for each of the 2 TPC bits may be identical; namely, the TPC bits in the TPC command 222 are either both "0" or both "1", given as "00" and "11", respectively. The TPC bits in the TPC command 222 may be used to adjust the downlink transmit power in order to converge the downlink transmit power to a desired target power. For example, if the TPC bits in the TPC command 222 are "0" or "00", the downlink transmit power may be decreased. In another example, if the TPC bits in the TPC command 222 are "1" or "11", the downlink transmit power may be increased.

While FIGS. 2 and 3 illustrate a 3GPP-UMTS uplink frame structure, a 3GPP2-UMTS uplink frame structure may be similar. However, a typical 3GPP2-UMTS uplink frame structure does not include the above-described TFCI 223 and FBI 224.

Figure 4:
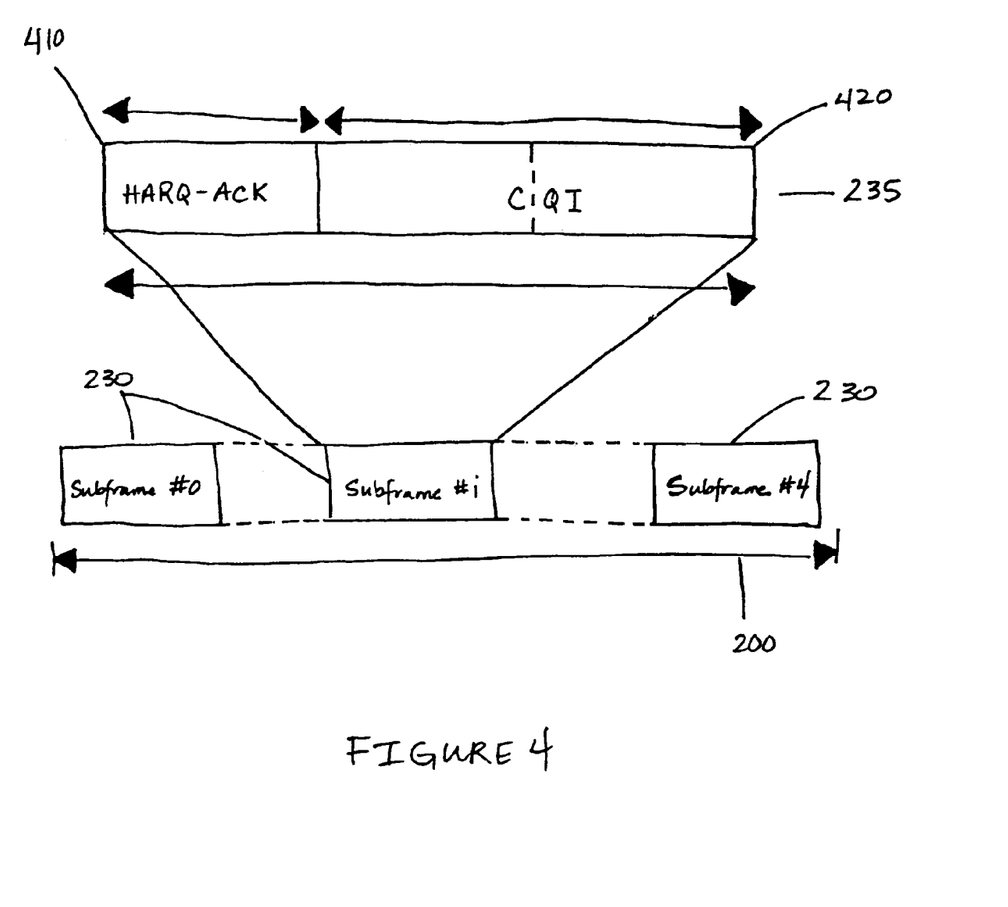
FIG. 4 illustrates a given subframe of a HS-DPCCH.

FIG. 4 illustrates a given subframe 230 of the HS-DPCCH 235. In the example where each frame 200 has a duration of 10 ms, each subframe 230 of the HS-DPCCH 235 may have a duration of 2 ms, which may be equivalent to 3 slots 205 for the DPCCH 220, where each slot 205 has a duration of ⅔ ms. Each subframe 230 may include a hybrid automatic request (HARQ)-acknowledgment (ACK) 410 and a channel quality indicator (CQI) 420. In an example, the HARQ-ACK 410 may be allotted 2560 chips (e.g., corresponding to a first slot 205 of the subframe 230) and the CQI 420 may be allotted 5120 chips (e.g., corresponding to second and third slots 205 of the subframe 230).

The CQI 420 may be reported once for each subframe 230, for example at an end of a given subframe 230 for which the CQI 420 is being reported. Thus, a highest rate that a UE may transmit the CQI 420 to a Node B may be once for every 3 slots 205 (e.g., 2 ms). However, to conserve UE battery power, 3GPP-UMTS standards allow the CQI 420 to be transmitted at a lower rate, for example every 80 subframes 230 or 240 slots 205.

Conventional Downlink Channel Quality Reporting

Channel quality at a given UE (e.g., UE 105, 110, etc.) is measured during a CQI measurement window. After the channel quality is measured, the given UE converts the measured channel quality into the CQI 420 and transmits the CQI 420 for representing the measured channel quality to a Node B (e.g., Node B 120, 122, 124, etc.). The CQI 420 experiences propagation delay during transmission from the UE to the Node B and arrives at the Node B at a later time than it was initially transmitted by the given UE. The Node B receives the CQI 420 and transfers the CQI 420 to the Node B scheduler, where the CQI 420 experiences a processing delay during the transfer. The Node B scheduler receives the CQI 420 and schedules an adjustment to downlink power (e.g., HS-SCCH power and/or selects an MCS for the HS-PDSCH) for transmissions from the Node B to the given UE based on the received CQI 420. The scheduled adjustment to the downlink power may take effect at a next downlink transmission. A given number of subframes may lapse between the measurement of the channel quality and the scheduled adjustment to the downlink power, where the number of subframes is at least min_CQI_T and no more than max_CQI_T. In an example, the min_CQI_T may be approximately 9 ms, which may correlate to 4.5 subframes or 13.5 slots. Various factors such as the propagation/processing delays may affect the min_CQI_T.

The above-described delays in the reporting of the CQI 420 may cause the downlink power to be adjusted based on older and/or inaccurate information at the Node B scheduler, such as in a situation where the channel quality at the UE changes rapidly (e.g., if the UE is moving at a high speed).

Downlink Channel Quality Prediction

An example embodiment of the present invention will now be described where channel quality estimates are used to estimate a current channel quality. As discussed above, the conventional art uses the previous CQI 420 as the current channel quality.

Figure 5:
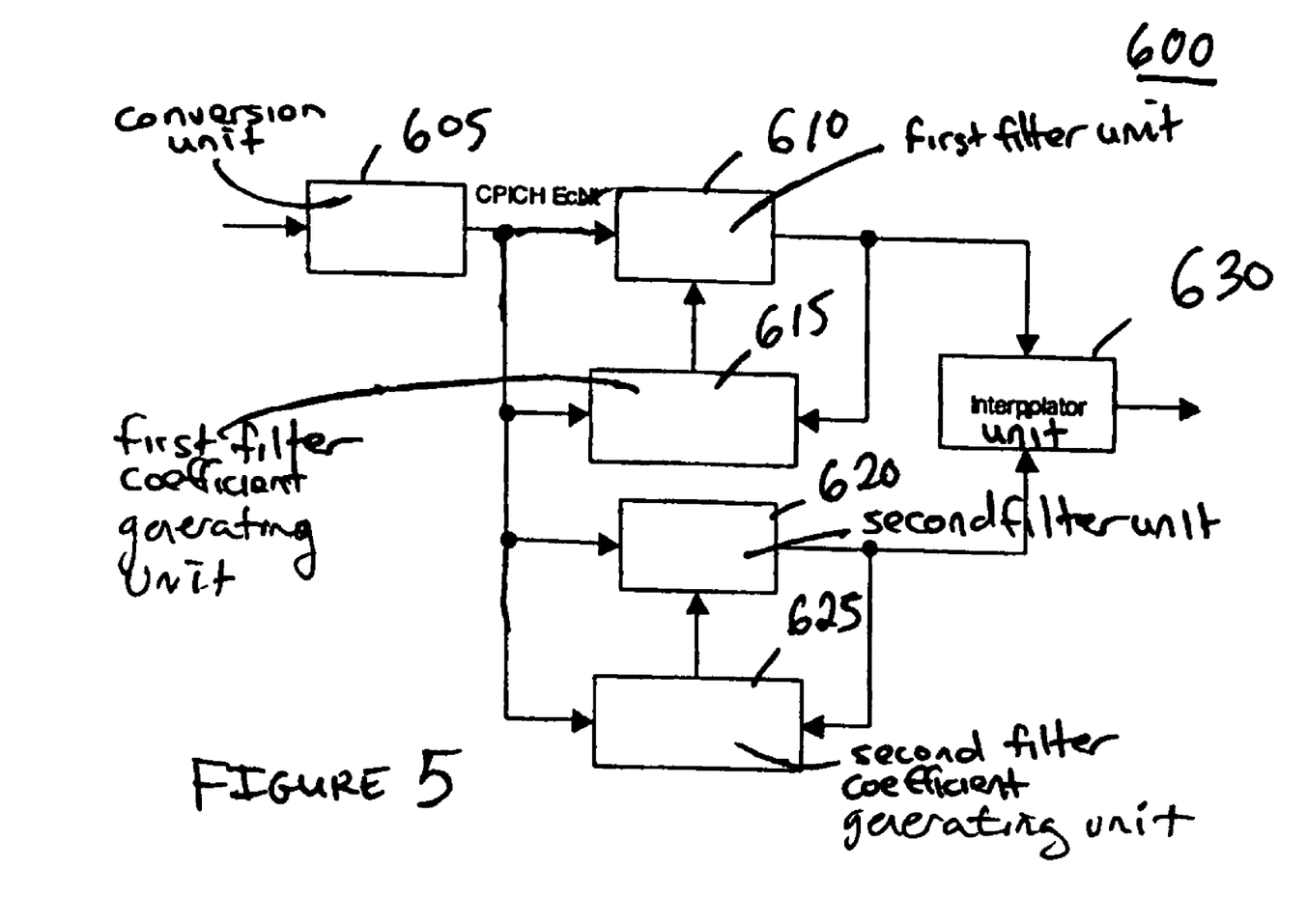
FIG. 5 illustrates a channel quality predictor according to an example embodiment of the present invention.

FIG. 5 illustrates a channel quality predictor 600 according to an example embodiment of the present invention. In an example, the channel quality predictor 600 is located at a Node B (e.g., Node B 120, Node B 122, Node B 124, etc.).

The channel quality predictor 600 includes a conversion unit 605, which receives the CQI 420 at the Node B during a subframe. The conversion unit 605 converts the received CQI 420 into a common pilot channel (CPICH) carrier-to-noise ratio Ec/Nt in any well-known manner. An updated CQI 420 may be received at the conversion unit 605 at a subframe interval, or multiples of a subframe interval such as every K subframes.

The channel quality predictor 600 further includes a first filter unit 610, a first filter coefficient generating unit 615, a second filter unit 620 and a second filter coefficient generating unit 625. Each of the first filter unit 610, the first filter coefficient generating unit 615, the second filter unit 620 and the second filter coefficient generating unit 625 receives the CPICH Ec/Nt from the conversion unit 605. The first filter unit 610, using filter coefficients generated by the first filter coefficient generating unit 615, generates a first CPICH Ec/Nt estimate based on the CPICH Ec/Nt from the conversion unit 605. The second filter unit 620, using filter coefficients generated by the second filter coefficient generating unit 625, generates a second CPICH Ec/Nt estimate based on the CPICH Ec/Nt from the conversion unit 605. In an example embodiment of the present invention, the first and second filter units 610 and 620 may include a finite impulse response (FIR) filter. In an alternative example embodiment, the first and second filter units 610 and 620 may include an infinite impulse response (IIR) filter. It is understood that other example embodiments of the present invention may include any well-known filter and/or any combination of well-known filters.

Each of the first and second CPICH Ec/Nt estimates are associated with a first subframe and a second subframe, respectively, where the first and second subframes are later in time as compared to the previous subframe in which the CQI 420 was received. In an example, the first subframe is min_CQI_T subframes later than the previous subframe in which the CQI 420 was received, and the second subframe is (min_CQI_T+X) subframes later than the previous subframe in which the CQI 420 was received; where min_CQI_T and X are natural numbers greater than or equal to 1. In a further example, X may be equal to the above-described subframe interval (e.g., K subframes). Since 3 time slots 205 are associated with each subframe 230, the first subframe and the second subframe may include 3X intervening slots 205.

The first and second filter coefficient generating units 615 and 625 respectively receive the first and second CPICH Ec/Nt estimates and the CPICH Ec/Nt output from the conversion unit 605. The first and second filter coefficient generating units 615 and 625 may use any well-known filter coefficient calculating algorithm, such as a least-mean-square (LMS) algorithm and/or a recursive-least-square (RLS) algorithm to generate the filter coefficients for the first and second filter units 610 and 620, respectively, based on the received CPICH Ec/Nt values. The above-given well-known filter coefficient calculating algorithms are given as examples only, and it is understood that other example embodiments of the present invention may employ any well-known filtering coefficient calculating algorithm.

The channel quality predictor 600 further includes an interpolator unit 630 which receives the first and second CPICH Ec/Nt estimates from the first and second filter units 610 and 620, respectively. The interpolator unit 630 produces a third CPICH Ec/Nt estimate for a desired slot between the first and second subframes (e.g., for a desired slot 205 among the 3X intervening slots 205) by interpolating between the first and second CPICH Ec/Nt estimates based on a position of the desired slot 205 between the first and second subframes.

In an example, if the second CPICH Ec/Nt estimate is higher than the first CPICH Ec/Nt estimate, then because the second subframe is later than the first subframe, the third CPICH Ec/Nt estimate for a later of the 3X intervening slots 205 will be higher than for an earlier of the 3X intervening slots 205. Likewise, in another example, if the second CPICH Ec/Nt estimate is lower than the first CPICH Ec/Nt estimate, the third CPICH Ec/Nt estimate for a later of the 3X intervening slots 205 will be lower than for an earlier of the 3X intervening slots 205.

In an example, the interpolator unit 630 may be a linear interpolator. However, it is understood that other example embodiments of the present invention may include any well-known interpolators.

The Node B scheduler may schedule an adjustment (e.g., an increase or decrease) to at least one downlink transmission parameter based on the third CPICH Ec/Nt estimate. In an example, the downlink transmission parameter may be downlink power. In this example, the Node B scheduler may increase or decrease downlink power on a downlink channel (e.g., one of a High Speed Downlink Shared Channel (HS-DSCH) and a High Speed Physical Downlink Shared Channel (HS-PDSCH)). Methodologies for adjusting downlink power on downlink channels based on CPICH Ec/Nt values are well known in the art and will not be discussed further for the sake of brevity.

In another example, the downlink transmission parameter may be a data encoding parameter. In this example, the adjustment step may increase or decrease the level of encoding on the HS-DSCH and/or the HS-PDSCH based on the third CPICH Ec/Nt estimate. In a further example, the encoding may be error encoding and the adjustment step may increase or decrease a level of cyclic redundancy check (CRC) bits in downlink data transmissions. Methodologies for adjusting data encoding levels on downlink channels based on CPICH Ec/Nt values are well known in the art and will not be discussed further for the sake of brevity.

Example embodiments of the present invention being thus described, it will be obvious that the same may be varied in many ways. For example, while example embodiments of the present invention have been described with respect to 3GPP-UMTS, it is understood that other example embodiments of the present invention may employ other UMTS protocols, CDMA2000 protocols, and/or any other well-known wireless communication protocol. It is further understood that while above-described example embodiments are described as using a FIR and/or an IIR filter, any well-known filter may be used in other example embodiments of the present invention. Such variations are not to be regarded as a departure from the example embodiments of the invention, and all such modifications are intended to be included within the scope of the invention.

We claim:

1. A method of estimating a channel condition, comprising:
   first estimating a channel quality metric for a first subframe based at least in part on a channel quality metric for a previous subframe, wherein the first estimating step filters the channel quality metric for the previous subframe to generate the estimated channel quality metric for the first sub frame;
   second estimating a channel quality metric for a second subframe based at least in part on the channel quality metric for the previous subframe, the second subframe being later in time than the first subframe, wherein the second estimating step filters the channel quality metric for the previous subframe to generate the estimated channel quality metric for the second subframe; and
   third estimating a channel quality metric for a time slot located between the first and second subframes based on the channel quality metrics for the first and second subframes.

2. The method of claim 1, wherein at least one of the first and second estimating steps performs infinite impulse response filtering.

3. The method of claim 1, wherein at least one of the first and second estimating steps performs finite impulse response filtering.

4. The method of claim 1, wherein the first estimating step determines at least one filter coefficient using one of a least-mean-square algorithm and a recursive-least-square algorithm based on the channel quality metric of the previous subframe and the estimated channel quality metric of the first sub frame.

5. The method of claim 1, wherein the second estimating step determines at least one filter coefficient using one of a least-mean-square algorithm and a recursive-least-square algorithm based on the channel quality metric of the previous subframe and the estimated channel quality metric of the second subframe.

6. The method of claim 1, wherein the third estimating step estimates the channel quality metric for the time slot by interpolation using the channel quality metrics for the first and second subframes.

7. The method of claim 6, wherein the interpolating is performed by a linear interpolator.

8. The method of claim 1, wherein the first and second subframes are separated by at least one subframe.

9. The method of claim 1, further comprising:
   receiving a channel quality indicator for the previous subframe; and
   converting the channel quality indicator into the channel quality metric for the previous subframe.

10. The method of claim 9, wherein the channel quality indicator is received on an uplink channel.

11. The method of claim 10, wherein the uplink channel is a High Speed Dedicated Physical Control Channel in accordance with 3GPP-UMTS.

12. The method of claim 1, wherein the first and second subframes are separated by at least one of a subframe interval and a multiple of the subframe interval.

13. The method of claim 1, further comprising:
   adjusting a downlink transmission parameter on a downlink channel based on the estimated channel quality metric for the time slot.

14. The method of claim 13, wherein the downlink transmission parameter includes a downlink transmission power and the adjusting step increases or decreases the downlink transmission power on the downlink channel.

15. The method of claim 13, wherein the downlink transmission parameter includes a data encoding/modulation parameter and the adjustment step increases or decreases a level of encoding/modulation on the downlink channel.

16. A channel quality predictor, comprising:
   a first filter coefficient generating unit generating at least one first filter coefficient, wherein the first filter coefficient generating unit generates the at least one first filter coefficient based on the channel quality metric for the previous subframe and output from the first filter;
   a second filter coefficient generating unit generating at least one second filter coefficient, wherein the second filter coefficient generating unit generates the at least one second filter coefficient based on the channel quality metric for the previous subframe and output from the second filter;
   a first filter unit filtering a channel quality metric for a previous subframe based on the at least one first filter coefficient to generate a channel quality metric estimate for a first subframe;
   a second filter unit filtering the channel quality metric for the previous subframe based on the at least one second filter coefficient to generate a channel quality metric estimate for a second subframe, later in time than the first subframe; and
   an interpolator unit estimating a channel quality metric for a time slot located between the first and second subframes based on the channel quality metric estimates for the first and second subframes.

17. The channel quality predictor of claim 16, wherein at least one of the first and second filters is an infinite impulse response filter.

18. The channel quality predictor of claim 16, wherein at least one of the first and second filters is a finite impulse response filter.

* * * * *

UNITED STATES PATENT AND TRADEMARK OFFICE
CERTIFICATE OF CORRECTION

PATENT NO.       : 7,403,745 B2                                          Page 1 of 1
APPLICATION NO.  : 11/194629
DATED            : July 22, 2008
INVENTOR(S)      : Dominique et al.

It is certified that error appears in the above-identified patent and that said Letters Patent is hereby corrected as shown below:

On the title page, item [75] should read:

(75)   Francis Dominique, Rockaway, NJ (US)
       Hongwei Kong, Denville, NJ (US)
       Walid E. Nabhane, Bedminster, NJ (US)

Signed and Sealed this

Second Day of September, 2008

JON W. DUDAS
*Director of the United States Patent and Trademark Office*